United States Patent
Bobel et al.

(10) Patent No.: US 11,870,089 B2
(45) Date of Patent: Jan. 9, 2024

(54) BATTERY CELL PACK

(71) Applicant: GM GLOBAL TECHNOLOGY OPERATIONS LLC, Detroit, MI (US)

(72) Inventors: Andrew C. Bobel, Troy, MI (US); Anil K. Sachdev, Rochester Hills, MI (US); Patrick H. Clark, Royal Oak, MI (US); Pooja Suresh, Madison Heights, MI (US); Ran Wu, Lake Orion, MI (US); Jermain E. Onye, Warren, MI (US); William Y. Chen, Troy, MI (US); Li Yang, Troy, MI (US); Chao Hu, Troy, MI (US); Yunshan Liu, Rochester Hills, MI (US); Kuo Sun, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 17/695,070

(22) Filed: Mar. 15, 2022

(65) Prior Publication Data

US 2023/0299404 A1    Sep. 21, 2023

(51) Int. Cl.
*H01M 50/242* (2021.01)
*H01M 50/209* (2021.01)
*H01M 10/658* (2014.01)

(52) U.S. Cl.
CPC ....... *H01M 50/242* (2021.01); *H01M 10/658* (2015.04); *H01M 50/209* (2021.01)

(58) Field of Classification Search
CPC .................... H01M 10/658; H01M 50/24–244
See application file for complete search history.

(56) References Cited

U.S. PATENT DOCUMENTS

| | | | |
|---|---|---|---|
| 2019/0341591 A1* | 11/2019 | Shepherd | H01M 50/24 |
| 2020/0194753 A1* | 6/2020 | Fujiwara | H01M 10/48 |
| 2020/0321571 A1* | 10/2020 | Ishikawa | H01M 10/0468 |
| 2021/0408573 A1* | 12/2021 | Schmieder | H01M 10/658 |

* cited by examiner

*Primary Examiner* — Milton I Cano
*Assistant Examiner* — Albert Michael Hilton
(74) *Attorney, Agent, or Firm* — Quinn IP Law

(57) ABSTRACT

A battery cell pack has a plurality of battery cells that are assembled into a prismatic frame, with deformable separators interposed to accommodate elastic and plastic deformation caused by cyclic and acyclic expansion and contraction thereof during charging and discharging over the life of the battery cell pack. The battery cells are arranged in a horizontal stack within the prismatic frame, and the deformable separators are interposed between subsets of the battery cells. The deformable separators exert compressive force on the subsets of the battery cells along a longitudinal axis that is defined by the horizontal stack. The compressive force exerted by the deformable separators is at least a minimum force over a service life of the battery cell pack.

15 Claims, 4 Drawing Sheets

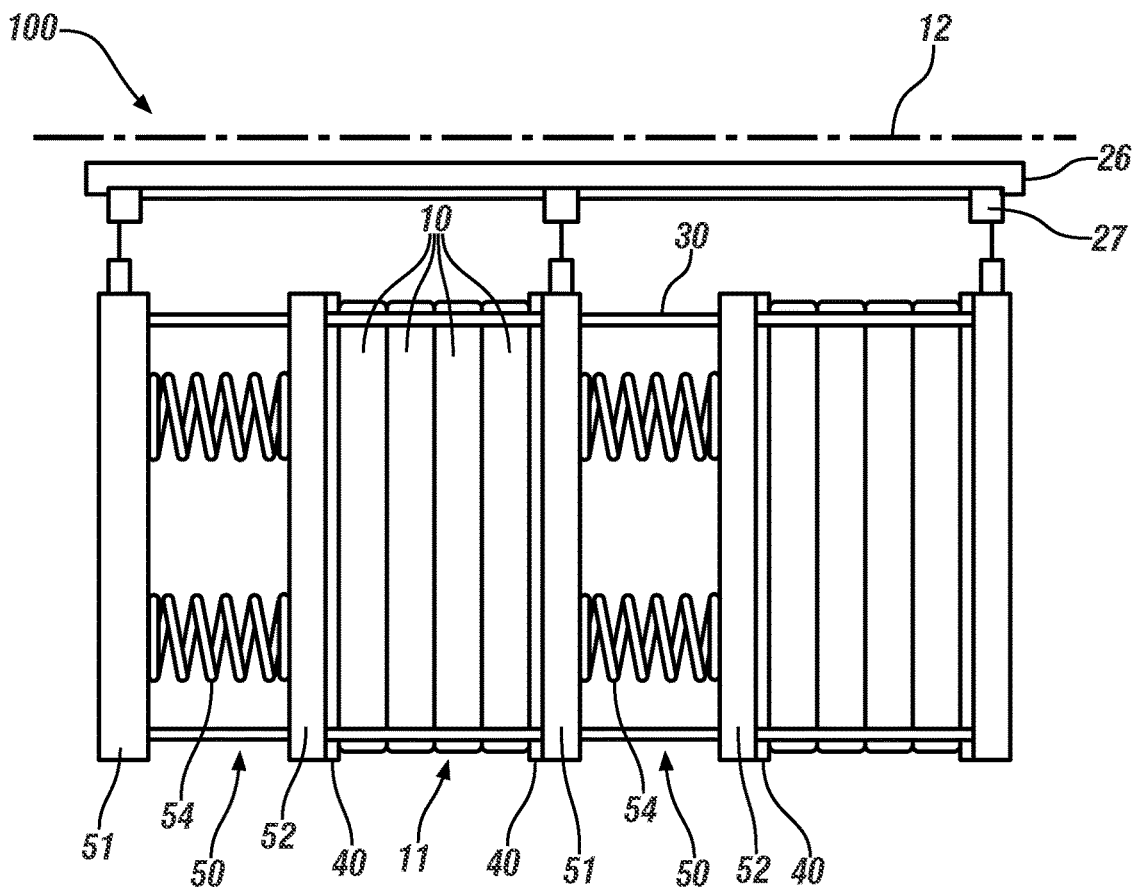
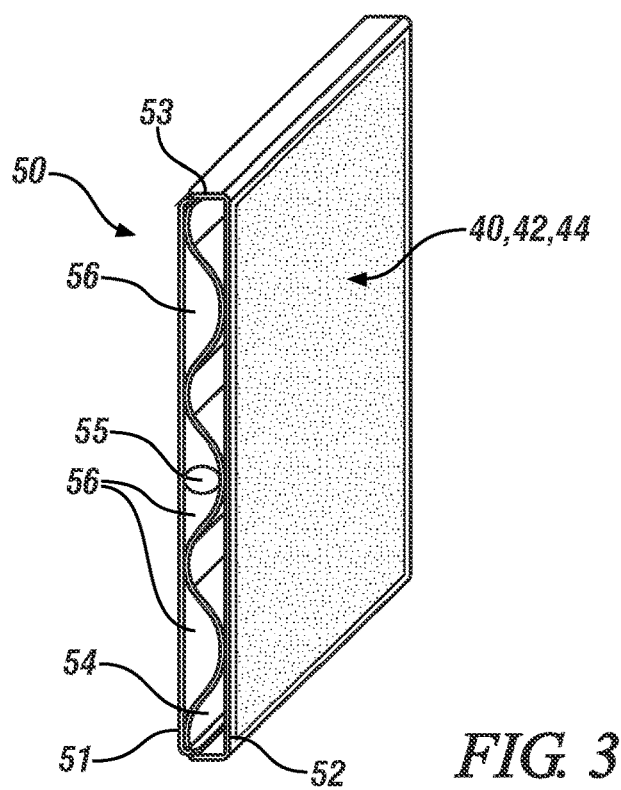

FIG. 4A
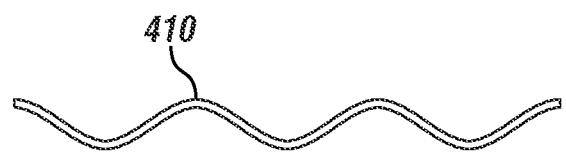
FIG. 4B
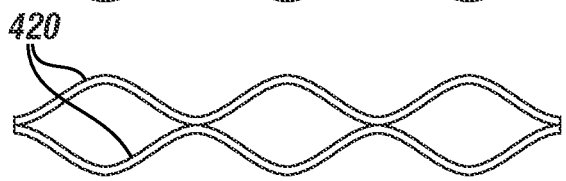
FIG. 4C
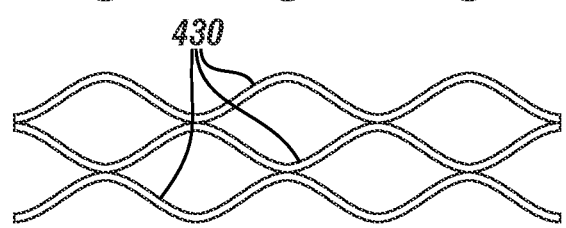
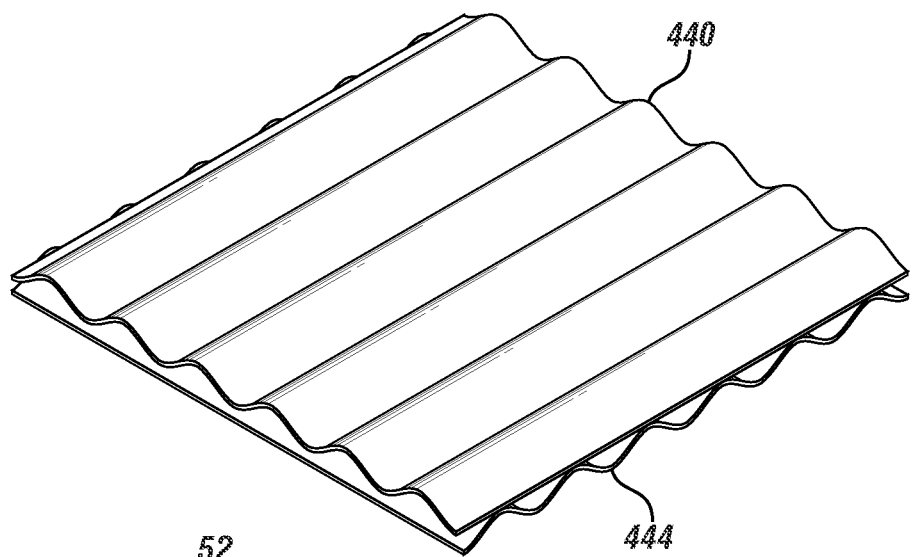
FIG. 4D
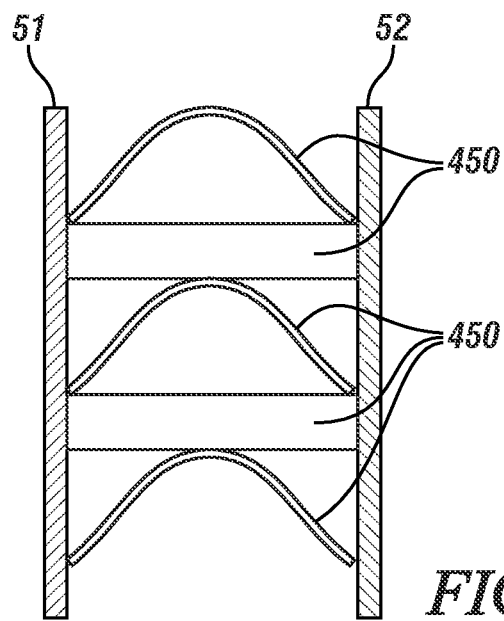
FIG. 4E

BATTERY CELL PACK

INTRODUCTION

Lithium ion battery packs may include multiple lithium ion battery cells, which may be assembled and electrically connected in parallel or in series in a battery cell pack, depending upon the needs of the system. Each battery cell includes one or a plurality of lithium ion electrode pairs that are enclosed within a sealed pouch envelope.

Each battery cell is configured to electrochemically store and release electric power by charging and discharging. The physical dimensions of a battery cell may change during charging and discharging, and over the life of the battery cell. In one example, a physical thickness of a pouch-type battery cell with a rigid outer periphery may change by as much as 50% over the course of its service life and during charging and discharging.

There is a need for a system and apparatus that accommodates elastic and plastic expansion and contraction of a plurality of battery cells arranged in a battery cell pack over a service life of a battery cell pack.

SUMMARY

The concepts herein provide for a battery cell pack having a plurality of battery cells that are assembled into a prismatic frame, with a plurality of deformable separators interposed to accommodate elastic and plastic deformation caused by cyclic and acyclic expansion and contraction thereof during charging and discharging over the life of the battery cell pack. The plurality of battery cells are arranged in a horizontal stack within the prismatic frame, and the plurality of deformable separators are interposed between subsets of the plurality of battery cells. The plurality of deformable separators exert compressive force on the subsets of the plurality of battery cells along a longitudinal axis that is defined by the horizontal stack. The compressive force exerted by the plurality of deformable separators is at least a minimum force over a service life of the battery cell pack.

An aspect of the disclosure includes the deformable separators exerting the compressive force on the subsets of the plurality of battery cells over a surface area that is coextensive with a surface of an adjacent one of the plurality of battery cells.

Another aspect of the disclosure includes the prismatic frame having first and second end pieces, first and second sides, and a plurality of axially-disposed rods, wherein the plurality of axially-disposed rods are arranged in parallel with the longitudinal axis.

Another aspect of the disclosure includes a plurality of barrier layers, wherein the plurality of barrier layers are interposed between the plurality of deformable separators and the plurality of battery cells.

Another aspect of the disclosure includes the barrier layer being a polyurethane planar sheet having an outer layer.

Another aspect of the disclosure includes the outer layer of the barrier layer being a thermal insulation layer.

Another aspect of the disclosure includes each of the subsets of the plurality of battery cells having a quantity of two battery cells.

Another aspect of the disclosure includes each of the subsets of the plurality of battery cells having a quantity of three, four, or five battery cells.

Another aspect of the disclosure includes the prismatic frame having a top cover, and wherein the plurality of deformable separators are coupled to the top cover of the prismatic frame via a plurality of clips.

Another aspect of the disclosure includes each of the plurality of deformable separators having a compressible spring arranged within a spring holding structure.

Another aspect of the disclosure includes the spring holding structure having a first planar sheet and a second planar sheet, wherein the first planar sheet is opposed to the second planar sheet, and wherein the compressible spring is interposed therebetween.

Another aspect of the disclosure includes the compressible spring being a wave spring.

Another aspect of the disclosure includes the wave spring being one of a single wave spring, a bi-wave spring, or a tri-wave spring.

Another aspect of the disclosure includes the compressible spring being one of a coil spring, a leaf spring, a bead spring, or a linear spring.

Another aspect of the disclosure includes the first planar sheet and the second planar sheet being fabricated from stainless steel.

Another aspect of the disclosure includes the plurality of battery cells being planar flexible pouch battery cells.

Another aspect of the disclosure includes thermal isolation material, wherein the thermal isolation material is inserted into a cavity defined by an inner portion of the deformable separator.

Another aspect of the disclosure includes a device that includes a deformable separator, a barrier layer, a thermal isolation material, and thermal mitigation material, wherein the thermal isolation material and the thermal mitigation material are inserted into a cavity defined by an inner portion of the deformable separator.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 2 schematically illustrates a cutaway side view of a portion of a battery cell pack, in accordance with the disclosure.

FIG. 3 schematically illustrates a cutaway isometric end view of a deformable separator, in accordance with the disclosure.

FIGS. 4A-4F schematically illustrate end view of embodiments of springs, in accordance with the disclosure.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments may be practiced without some of these details. Moreover, for the purpose of clarity, certain technical material that is understood in the related art has not been described in detail to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be employed to assist in describing the drawings. These and similar directional terms are illustrative, and are not to be construed to limit the scope of the disclosure. Furthermore, the disclosure, as illustrated and described herein, may be practiced in the absence of an element that is not specifically disclosed herein.

Figure 1:
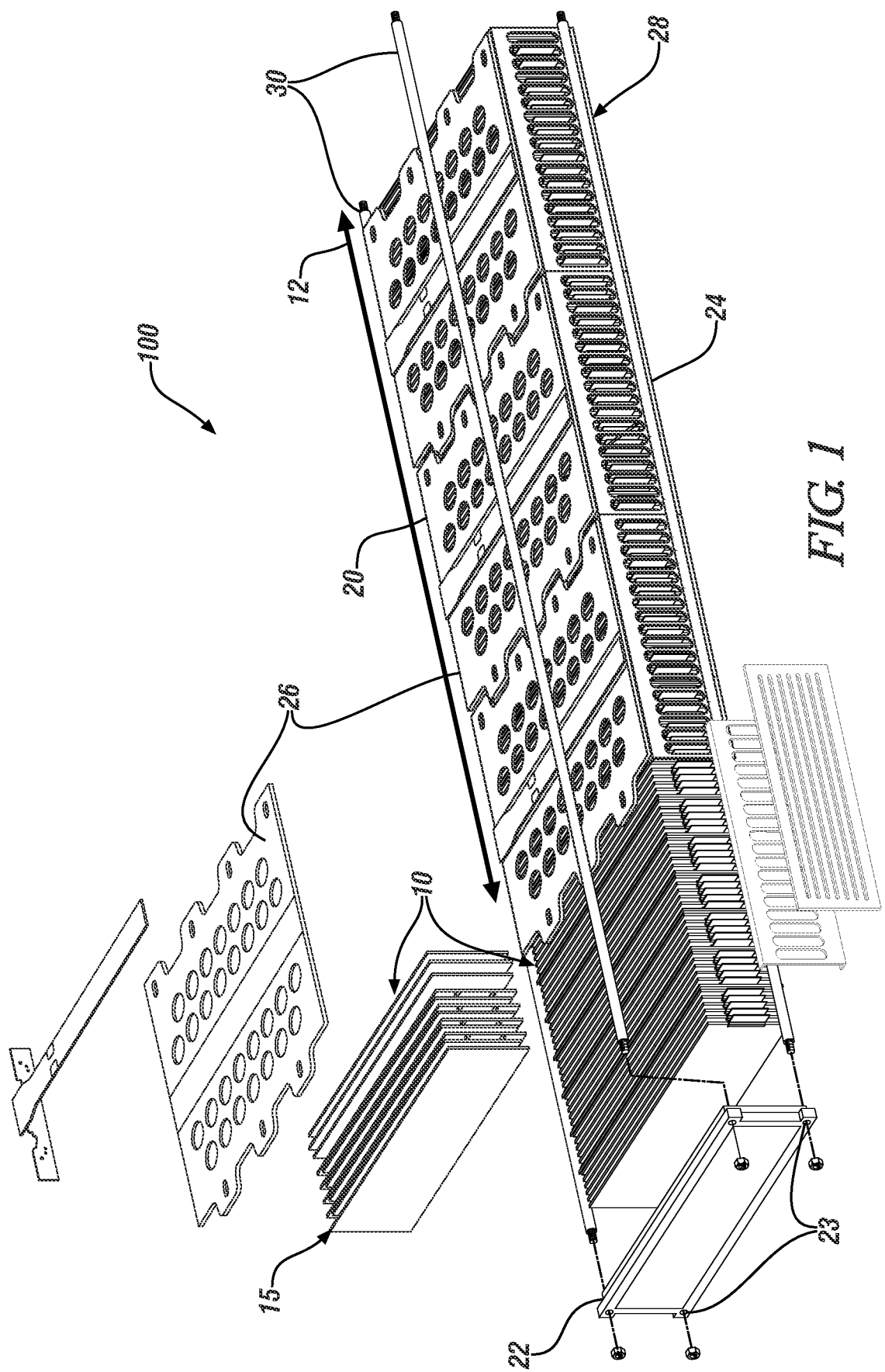
FIG. 1 schematically illustrates a partially-exploded isometric view of a battery cell pack, in accordance with the disclosure.

Referring to the drawings, wherein like reference numerals correspond to like or similar components throughout the several Figures, FIG. 1 schematically illustrates an embodiment of a Rechargeable Energy Storage System (RESS) that includes a battery cell pack 100 that is composed of a plurality of pouch-type electrochemical battery cells 10. The battery cells 10 are lithium ion battery cells 10 in one embodiment, although the disclosure is not so limited. The pouch-type battery cells 10 are arranged in a horizontal stack 15 along a longitudinal axis 12 and encased in a housing 20 that is arranged as a rectangular prism. The housing 20 includes opposed end plates 22, opposed side plates 24, a top section 26, and a bottom portion 28, all of which are rectangularly shaped. In one embodiment, and as shown, a plurality of elongated rods 30 are arranged parallel to the longitudinal axis 12, and traverse from respective corners 23 of the opposed end plates 22 of the housing 20.

Figure 6:
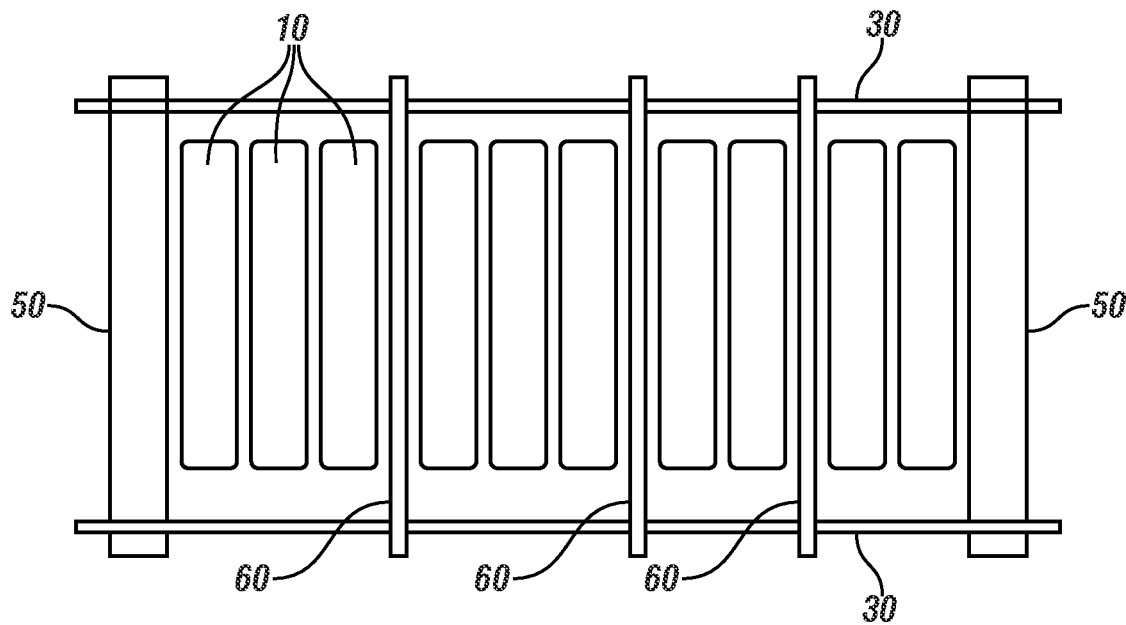
FIG. 6 schematically illustrates a top view of a portion of an embodiment of the battery cell pack, in accordance with the disclosure.

FIG. 2 schematically illustrates a side view of a portion of an embodiment of the battery cell pack 100, including opposed end plates 22, elongated rods 30, a plurality of the battery cells 10 arranged in subsets 11, a plurality of deformable separators 50 including barrier layers 40, and, in one embodiment, one or more intermediate sheets 60 (shown with reference to FIG. 6).

Referring again to FIG. 2, the plurality of deformable separators 50 with barrier layers 40 are interposed between the subsets 11 of the battery cells 10 to exert compressive force on the subsets 11 of the battery cells 10 along the longitudinal axis 12 that is defined by the horizontal stack 15.

In one embodiment, and as shown, each of the subsets 11 is composed with a quantity of four of the battery cells 10. Alternatively, each of the subsets 11 may be composed with a quantity of two, three, five or another quantity of the battery cells 10.

Each of the deformable separators 50 includes a first sheet 51 arranged in opposition to a second sheet 52, and a compressible spring 54 arranged therebetween employing a spring holding structure 53. The compressible spring 54 is arranged to exert an expanding force on the first and second sheets 51, 52, which in turn exerts a compressive force on an adjacent one of the subsets 11 of the plurality of battery cells 10 when assembled into the battery cell pack 100. The compressive force is advantageously uniformly distributed over a surface area that is coextensive with a surface of an adjacent one of the battery cells 10 of the respective subset 11.

The first and second sheets 51, 52 have surface areas that are coextensive with a surface area of the corresponding one of the battery cells 10. The first and second sheets 51, 52 are fabricated from stainless steel, ceramic, titanium, brass, or another non-corrodible material.

Each of the deformable separators 50 is interposed between the subsets 11 of the plurality of battery cells 10 to accommodate elastic and plastic deformation caused by cyclic and acyclic expansion and contraction thereof during charging and discharging over the service life of the battery cell pack In one embodiment, the first sheet 51 is fixedly secured to the top section 26 of the housing 20 via one or multiple clips 27. In this arrangement, the compressible spring 54 urges the second sheet 52 to exert a uniform compressive force upon the proximal subset 11 of the battery cells 10.

Embodiments of the compressible spring 54 may include a wave spring, a coil spring, a leaf spring, a bead spring, a linear spring, or another form of compressible spring device having predetermined properties of elasticity and plasticity. The compressible spring 54 as shown is arranged as a single coil spring. When the compressible spring 54 is a wave spring, it may be a single wave spring, a bi-wave spring, a tri-wave spring, a complex wave spring, or another form of wave spring. FIGS. 4A-4F schematically illustrate examples of compressible springs 54. Spring design parameters are selected to achieve a desired stress/strain relation for elasticity and plasticity, and include, e.g., material selection, quantity of layers, material thickness, width(s), depth(s), quantity of convolutions (in a wave spring), etc. The desired stress/strain relation for elasticity and plasticity is application-specific, and is developed and tuned based upon expected life-cycle expansion and contraction of the plurality of battery cells 10. It is appreciated that a single one of the compressible springs 54 may be employed, or multiple compressible springs 54 may be employed in each of the deformable separators 50 to achieve the desired stress/strain relation for elasticity and plasticity.

Figure 4F:
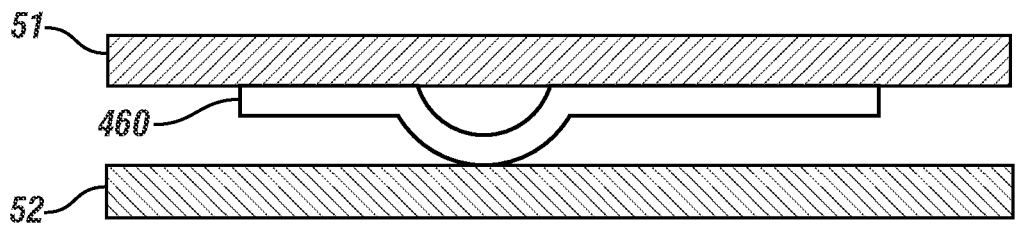

FIG. 4A schematically illustrates an end view of a single-wave wave spring 410. FIG. 4B schematically illustrates an end view of a bi-wave wave spring 420. FIG. 4C schematically illustrates an end view of a tri-wave wave spring 430. FIG. 4D schematically illustrates an end view of a square-wave wave spring 440. Each of the wave springs advantageously employs multiple lobes to provide uniform distribution of the compressive force over the inner surface areas of the first and second sheets 51, 52, which provides a uniform distribution of the compressive force over a surface area of the proximal battery cell 10. FIG. 4E schematically illustrates an end view of a linear spring 450 arranged between the first and second sheets 51, 52. Multiple linear springs are employed to provide uniform distribution of the compressive force over the inner surface areas of the first and second sheets 51, 52, which provides a uniform distribution of the compressive force over a surface area of the proximal battery cell 10. FIG. 4F schematically illustrates an end view of a bead spring 460 arranged between the first and second sheets 51, 52. Multiple bead springs are employed to provide uniform distribution of the compressive force over the inner surface areas of the first and second sheets 51, 52, which provides a uniform distribution of the compressive force over a surface area of the proximal battery cell 10.

Referring again to FIG. 2, the compressible spring 54 is fabricated from spring steel or another material. The type of the steel material may be a steel material for a general suspension coil spring, in one embodiment. Apart from the spring steel, high-strength steel, or steel for carburizing, for example, may be used. Alternatively, in some embodiments, low-carbon steel having a carbon concentration of approximately 0.15 to 0.60 wt. % may be used. Alternatively, the compressible spring 54 may be fabricated from ceramic materials, or another material capable of providing the desired stress/strain relation for elasticity and plasticity The deformable separators 50 are configured to exert compressive force on the subsets 11 of the plurality of battery cells 10 over a surface area that is coextensive with a surface of an adjacent one of the plurality of battery cells 10.

Barrier layers 40 are arranged on the outer face of the first sheet 51 and the second sheet 52 of each of the deformable separators 50. Each barrier layer 40 has a surface area that is at least coextensive with a face of an adjacent one of the proximal battery cell 10. Each barrier layer 40 may include, in one embodiment, a planar sheet or envelope 42 with an outer layer 44 that is in contact with one of the battery cells 10. Each planar sheet 42 may be fabricated from a non-porous material, of, polyurethane, and has an elasticity that permits flexure in response to expansive or compressive forces originating from either or both the deformable separators 50 and the plurality of battery cells 10. The outer layer 44 includes electrically and thermally insulative materials, and/or a thermal-resistant material that is applied as an adhesive sheet, via a coating process or another process.

In one embodiment, the barrier layer 40 may omit the planar sheet 42 and employ only the outer layer 44. Alternatively, the planar sheet 42 may completely encapsulated the outer layer 44.

The outer layer 44 may be an aerogel that is applied as a thin film in one embodiment, or may be a liquid that is spray-coated onto the surface of the outer face of the first sheet 51 and/or the second sheet 52, or may be applied employing another process.

The outer layer 44 may include an insulation layer with a thermal barrier layer having an elasticity that is coupled with the elastic-plastic behavior of the deformable separators 50. The outer layer 44 may be treated employing a thermal-resistant spray coating. In one embodiment, the outer layer 44 includes a nano-silica sheet. In one embodiment, the outer layer 44 includes a silicone coating to provide electrical isolation, which may be applied via a spray-coating process. In one embodiment, the outer layer 44 includes a chemically reactive coating to provide thermal runaway propagation mitigation.

Figures 5A, 5B, 5C:
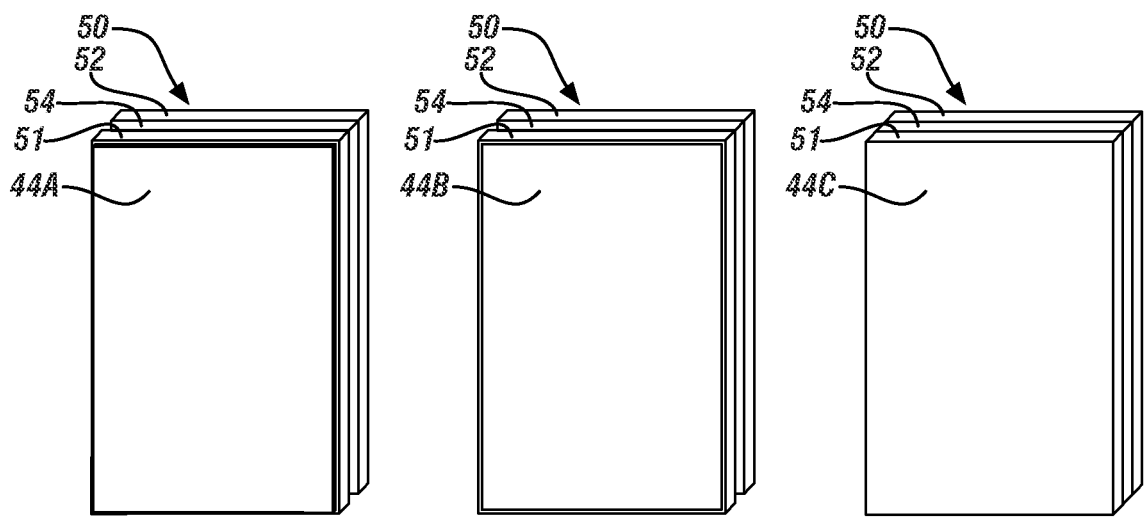
FIGS. 5A-5C schematically illustrate embodiments of a deformable separator with an applied outer layer, in accordance with the disclosure.

FIG. 5A schematically illustrates an embodiment of the deformable separator 50 including first sheet 51 arranged in opposition to second sheet 52 with compressible spring 54 arranged therebetween, and with an outer layer 44A applied to both the first sheet 51 and the second sheet 52. In this embodiment, the outer layer 44A is a nano-silica sheet that is adhered to the surfaces of the first and second sheets 51, 52.

FIG. 5B schematically illustrates another embodiment of the deformable separator 50 including first sheet 51 arranged in opposition to second sheet 52 with compressible spring 54 arranged therebetween, and with an outer layer 44B applied to both the first sheet 51 and the second sheet 52. In this embodiment, the outer layer 44B is in the form of a silicone coating that is applied via spray coating to the surfaces of the first and second sheets 51, 52. The silicone coating provides electrical isolation.

FIG. 5C schematically illustrates another embodiment of the deformable separator 50 including first sheet 51 arranged in opposition to second sheet 52 with compressible spring 54 arranged therebetween, and with an outer layer 44C applied to both the first sheet 51 and the second sheet 52. In this embodiment, the outer layer 44C includes a chemically reactive coating for mitigation of thermal runaway propagation to the inner and outer surfaces of the first and second sheets 51, 52.

FIG. 3 schematically illustrates a cutaway isometric end view of one of the deformable separators 50, and includes the first sheet 51 arranged in opposition to the second sheet 52 with compressible spring 54 arranged therebetween employing a spring holding structure 53 that includes an overlapping slide portion.

The spring holding structure 53 includes end portions of the first sheet 51 of the deformable separator 50, and the overlapping slide portion facilitates movement of the first sheet 51 in relation to the second sheet 52 during compression of the deformable separator 50.

The compressible spring 54 is a multi-lobed single wave spring as shown, wherein alternating lobes are in contact with the first sheet 51 and the second sheet 52. When so arranged, the compressible spring 54 and the first and second sheets 51, 52 form a plurality of cavities 56 into which a thermal isolation material and/or a thermal runaway propagation mitigation material, collectively illustrated as element 55, may be inserted. The thermal propagation mitigation material acts to isolate a cell group from adjacent cell groups during a thermal runaway event to prevent thermal runaway propagation. Thermal runaway barriers often include thermal insulators because the low thermal conductivity of insulators prevents heat transfer through the barrier.

The barrier layers 40 are arranged on the outer face of the first sheet 51 and the second sheet 52.

FIG. 6 schematically illustrates a top view of a portion of an embodiment of the battery cell pack 100, including opposed end plates 22, elongated rods 30, a plurality of the battery cells 10 arranged in subsets 11, a plurality of deformable separators 50, and a plurality of intermediate sheets 60. In one embodiment, the intermediate sheets 60 are planar elements fabricated from a rigid material, e.g., polyurethane, and have a surface area that is coextensive with a surface area of one of the pouch-type battery cells 10. In one embodiment, the planar surfaces of the intermediate sheets 60 have electrically and thermally insulative materials applied thereto as an adhesive sheet, via a coating process or another process. The intermediate sheets 60 re-distribute cell surface stress uniformly, and support the position of the elongated rods 30 against bending, bowing, etc.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:
1. A battery cell pack comprising:
a prismatic frame;
a plurality of battery cells; and
a plurality of deformable separators;

wherein the plurality of battery cells are arranged in a horizontal stack within the prismatic frame;

wherein the plurality of deformable separators are interposed between subsets of the plurality of battery cells;

wherein the plurality of deformable separators exert a compressive force on the subsets of the plurality of battery cells along a longitudinal axis that is defined by the horizontal stack;

wherein each of the plurality of deformable separators comprises a compressible spring arranged within a spring holding structure;

wherein the spring holding structure comprises a first planar sheet and a second planar sheet opposed to the first planar sheet and each extending along a first axis that is perpendicular to the longitudinal axis;

wherein the first planar sheet has a first end extending along a second axis that is perpendicular to the first axis and parallel to the longitudinal axis;

wherein the second planar sheet has a second end extending parallel to the second axis and overlapping the first end;

wherein the compressible spring is interposed between the first planar sheet and the second planar sheet and abuts the first end;

wherein the spring holding structure includes an overlapping slide portion including the first end and the second end and configured to facilitate movement of the first end with respect to the second end along the second axis during compression of the deformable separator.

2. The battery cell pack of claim 1, wherein the deformable separators exert the compressive force on the subsets of the plurality of battery cells over a surface area that is coextensive with a surface of an adjacent one of the plurality of battery cells.

3. The battery cell pack of claim 1, wherein the prismatic frame includes first and second end pieces, first and second sides, and a plurality of axially-disposed rods, wherein the plurality of axially-disposed rods are arranged in parallel with the longitudinal axis.

4. The battery cell pack of claim 1, further comprising a plurality of barrier layers, wherein the plurality of barrier layers are interposed between the plurality of deformable separators and the plurality of battery cells.

5. The battery cell pack of claim 4, wherein the plurality of barrier layers comprises a planar sheet having an outer layer.

6. The battery cell pack of claim 5, wherein the outer layer comprises a thermal insulation layer.

7. The battery cell pack of claim 1, wherein the each of the subsets of the plurality of battery cells includes a quantity of two battery cells.

8. The battery cell pack of claim 1, wherein the each of the subsets of the plurality of battery cells includes a quantity of three, four, or five battery cells.

9. The battery cell pack of claim 1, wherein the prismatic frame includes a top cover, and wherein the plurality of deformable separators are coupled to the top cover of the prismatic frame via a plurality of clips.

10. The battery cell pack of claim 1, wherein the compressible spring comprises a wave spring.

11. The battery cell pack of claim 10, wherein the wave spring comprises one of a single wave spring, a bi-wave spring, or a tri-wave spring.

12. The battery cell pack of claim 1, wherein the compressible spring comprises one of a coil spring, a leaf spring, a bead spring, or a linear spring.

13. The battery cell pack of claim 1, wherein the first planar sheet and the second planar sheet are fabricated from stainless steel.

14. The battery cell pack of claim 1, wherein the plurality of battery cells comprises planar flexible pouch battery cells.

15. The battery cell pack of claim 1, further comprising a thermal isolation material, wherein the thermal isolation material is inserted into a cavity defined by an inner portion of the deformable separator.

* * * * *